(12) United States Patent
Lan et al.

(10) Patent No.: US 9,460,334 B2
(45) Date of Patent: Oct. 4, 2016

(54) CONTROL METHOD FOR FINGERPRINT RECOGNITION APPARATUS

(71) Applicant: Egis Technology Inc., Taipei (TW)

(72) Inventors: Kuo-Neng Lan, Taipei (TW); Yuan-Lin Chiang, Taipei (TW)

(73) Assignee: Egis Technology Inc., Taipei (TW)

( * ) Notice: Subject to any disclaimer, the term of this patent is extended or adjusted under 35 U.S.C. 154(b) by 0 days.

(21) Appl. No.: 14/615,361

(22) Filed: Feb. 5, 2015

(65) Prior Publication Data

US 2016/0034741 A1 Feb. 4, 2016

(30) Foreign Application Priority Data

Aug. 1, 2014 (TW) .............................. 103126347 A (51) Int. Cl.
*G06K 9/00* (2006.01)
*G06F 1/32* (2006.01)

(52) U.S. Cl.
CPC ............. *G06K 9/00087* (2013.01); *G06F 1/32* (2013.01); *G06K 9/00* (2013.01); *G06K 9/0002* (2013.01)

(58) Field of Classification Search
CPC ..................... G06F 2203/0338; G06F 3/0488; G06F 3/03547; G06F 21/32; G06F 3/0304; G06F 21/31; G06F 3/0487; G06F 3/041; G06F 3/044; G06F 21/83; G06F 3/0412; G06F 1/32; H04M 1/72563; H04M 1/72594; H04M 2250/12; H04M 2250/22; H04W 12/06; H04W 88/02; G06K 9/00375; G06K 9/00369; G06K 9/036; G06K 19/12; G06K 9/00006; G06K 9/00053; G06K 9/00013; G06K 19/0718; G06K 19/07354; G06K 9/00087; G06K 9/0002; G07C 9/00158; G07C 9/00; G07C 9/00563; G07C 9/00134; B60R 25/252; B60R 25/25; H04L 63/0861; H04L 9/3231; A61B 5/14552; A61B 5/1172; G01B 7/287; G06Q 20/40145; G06Q 20/3674
USPC ........ 382/107, 124, 126; 345/156, 157, 161, 345/173, 174
See application file for complete search history.

(56) References Cited

U.S. PATENT DOCUMENTS 6,792,287 B1    9/2004  Tuomela et al.
7,064,743 B2 *  6/2006  Nishikawa ......... G06K 9/00026
                                                        345/157

(Continued)

FOREIGN PATENT DOCUMENTS

CN      103167092       6/2013
CN      103257826 A     8/2013

OTHER PUBLICATIONS

Taiwan Patent Office, Office Action, Patent Application Serial No. 103126347, Jun. 13, 2016, Taiwan.

*Primary Examiner* — Vu Le
*Assistant Examiner* — Aklilu Woldemariam (57) ABSTRACT

An electronic device is provided. The electronic device includes: a processor; a fingerprint recognition apparatus comprising a plurality of fingerprint sensing cells and a plurality of touch sensing cells; and a housing, wherein the processor is installed inside the housing. When an application executed by the processor does not utilize the fingerprint recognition apparatus, the processor controls the fingerprint recognition apparatus to enter a power-down mode to turn off the fingerprint sensing cells and the touch sensing cells. When the processor receives a fingerprint recognition request signal from the application, the processor further controls the fingerprint recognition apparatus to enter a power-saving mode to capture a first sensed image. When the processor determines that the first sensed image is a fingerprint image, the processor further controls the fingerprint recognition apparatus to enter an operation mode.

16 Claims, 7 Drawing Sheets

(56) References Cited

U.S. PATENT DOCUMENTS

| | | | |
|---|---|---|---|
| 2001/0017934 A1* | 8/2001 | Paloniemi | G06F 3/03547 382/107 |
| 2002/0030359 A1* | 3/2002 | Bergenek | G06F 21/32 283/68 |
| 2004/0208349 A1* | 10/2004 | Ide | A61B 5/1172 382/124 |
| 2005/0012714 A1* | 1/2005 | Russo | G06F 3/033 345/157 |
| 2005/0041885 A1* | 2/2005 | Russo | G06F 3/03547 382/289 |
| 2005/0174325 A1* | 8/2005 | Setlak | G06F 21/32 345/156 |
| 2005/0244039 A1* | 11/2005 | Geoffroy | G06K 9/00026 382/126 |
| 2005/0249386 A1* | 11/2005 | Juh | G06F 3/03543 382/124 |
| 2006/0078176 A1* | 4/2006 | Abiko | G06F 3/03547 382/124 |
| 2006/0088195 A1* | 4/2006 | Tykowski | G06F 1/32 382/124 |
| 2007/0217662 A1 | 9/2007 | Matsunaga et al. | |
| 2008/0036739 A1* | 2/2008 | Juh | G06F 3/03547 345/161 |
| 2008/0205714 A1* | 8/2008 | Benkley | G06F 3/03547 382/126 |
| 2009/0196468 A1* | 8/2009 | Chang | G06F 3/0488 382/124 |
| 2010/0118131 A1* | 5/2010 | Lee | G06K 9/00013 348/77 |
| 2011/0032206 A1* | 2/2011 | Kitamura | G06F 1/169 345/173 |
| 2011/0044514 A1* | 2/2011 | Rahmes | G06K 9/00067 382/124 |
| 2011/0193727 A1 | 8/2011 | Goto et al. | |
| 2011/0298711 A1* | 12/2011 | Dean | G06F 3/03547 345/161 |
| 2011/0300829 A1 | 12/2011 | Nurmi et al. | |
| 2012/0206586 A1* | 8/2012 | Gardner | G06K 9/00026 348/77 |
| 2012/0281890 A1* | 11/2012 | Kamakura | G06K 9/00067 382/126 |
| 2013/0279769 A1* | 10/2013 | Benkley, III | G06K 9/00013 382/124 |
| 2013/0287274 A1* | 10/2013 | Shi | G06K 9/0002 382/124 |
| 2014/0101737 A1* | 4/2014 | Rhee | G06F 21/32 726/6 |
| 2014/0176332 A1* | 6/2014 | Alameh | G06F 21/32 340/665 |
| 2014/0270413 A1* | 9/2014 | Slaby | G06F 3/0488 382/124 |
| 2014/0270414 A1* | 9/2014 | Slaby | G06K 9/00013 382/124 |
| 2015/0036065 A1* | 2/2015 | Yousefpor | G06K 9/228 349/12 |
| 2015/0070323 A1* | 3/2015 | Hong | G06F 3/147 345/175 |
| 2015/0109214 A1* | 4/2015 | Shi | G06F 3/044 345/173 |

* cited by examiner

FIG. 3

CONTROL METHOD FOR FINGERPRINT RECOGNITION APPARATUS

CROSS REFERENCE TO RELATED APPLICATIONS

This application claims priority of Taiwan Patent Application No. 103126347, filed on Aug. 1, 2014, the entirety of which is incorporated by reference herein.

BACKGROUND OF THE INVENTION

1. Field of the Invention

The present invention relates to fingerprint recognition, and, in particular, to an electronic device having a low-power fingerprint recognition apparatus and an associated control method.

2. Description of the Related Art

With advances in technology, mobile devices such as smartphones and tablet PCs have become more and more popular. Currently, users demand better security for their mobile devices, and thus it is a trend to develop mobile devices equipped with a fingerprint recognition apparatus to identify the user. However, there is limited battery power in mobile devices, and it has become a new topic to develop a low-power fingerprint recognition apparatus and fingerprint recognition mechanisms.

BRIEF SUMMARY OF THE INVENTION

In view of the above, an electronic device having a low-power fingerprint recognition apparatus and its control method are provided in the invention, thereby reducing the power consumption of the fingerprint recognition apparatus in the mobile device.

In an exemplary embodiment, an electronic device is provided. The electronic device comprises: a processor; a fingerprint recognition apparatus comprising a plurality of fingerprint sensing cells and a plurality of touch sensing cells; and a housing, wherein the processor is installed inside the housing. When an application executed by the processor does not utilize the fingerprint recognition apparatus, the processor controls the fingerprint recognition apparatus to enter a power-down mode to turn off the fingerprint sensing cells and the touch sensing cells. When the processor receives a fingerprint recognition request signal from the application, the processor further controls the fingerprint recognition apparatus to enter a power-saving mode to capture a first sensed image. When the processor determines that the first sensed image is a fingerprint image, the processor further controls the fingerprint recognition apparatus to enter an operation mode.

In another exemplary embodiment, a control method of a fingerprint recognition apparatus for use in an electronic device is provided. The electronic device comprises a processor, a fingerprint recognition apparatus and a housing. The fingerprint recognition apparatus comprises a plurality of fingerprint sensing cells and a plurality of touch sensing cells, and the processor is installed within the housing. The method comprises the steps of: controlling the fingerprint recognition apparatus to enter a power-down mode to turn off the fingerprint sensing cells and the touch sensing cells when an application executed by the application does not utilize the fingerprint recognition apparatus; controlling the fingerprint recognition apparatus to enter a power-saving mode to capture a first sensed image when the processor receives a fingerprint recognition request signal from the application; and controlling the fingerprint recognition apparatus to enter an operation mode when it is determined that the first sensed image is a fingerprint image.

In yet another exemplary embodiment, an electronic device is provided. The electronic device comprises: a processor; a fingerprint recognition apparatus comprising a plurality of fingerprint sensing cells; and a housing. The processor is installed inside the housing. When an application executed by the processor does not use the fingerprint recognition apparatus, the processor controls the fingerprint recognition apparatus to enter a power-down mode to turn off the fingerprint sensing cells. When the processor receives a fingerprint recognition request signal from the application, the processor further controls the fingerprint recognition apparatus to enter a power-saving mode and activates a portion of the fingerprint sensing cells to capture a first sensed image. When the processor determines that the first sensed image is a fingerprint image, the processor further controls the fingerprint recognition apparatus to enter an operation mode.

In yet another embodiment, a control method of a fingerprint recognition apparatus for use in an electronic device is provided. The electronic device comprises a processor, a fingerprint recognition apparatus, and a housing. The fingerprint recognition apparatus comprises a plurality of fingerprint sensing cells, and the processor is installed within the housing. The method comprises the steps of: controlling the fingerprint recognition apparatus to enter a power-down mode to turn off the fingerprint sensing cells and the touch sensing cells when an application executed by the application does not utilize the fingerprint recognition apparatus; controlling the fingerprint recognition apparatus to enter a power-saving mode and activate a portion of the fingerprint sensing cells to capture a first sensed image when the processor receives a fingerprint recognition request signal from the application; and controlling the fingerprint recognition apparatus to enter an operation mode when it is determined that the first sensed image is a fingerprint image.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
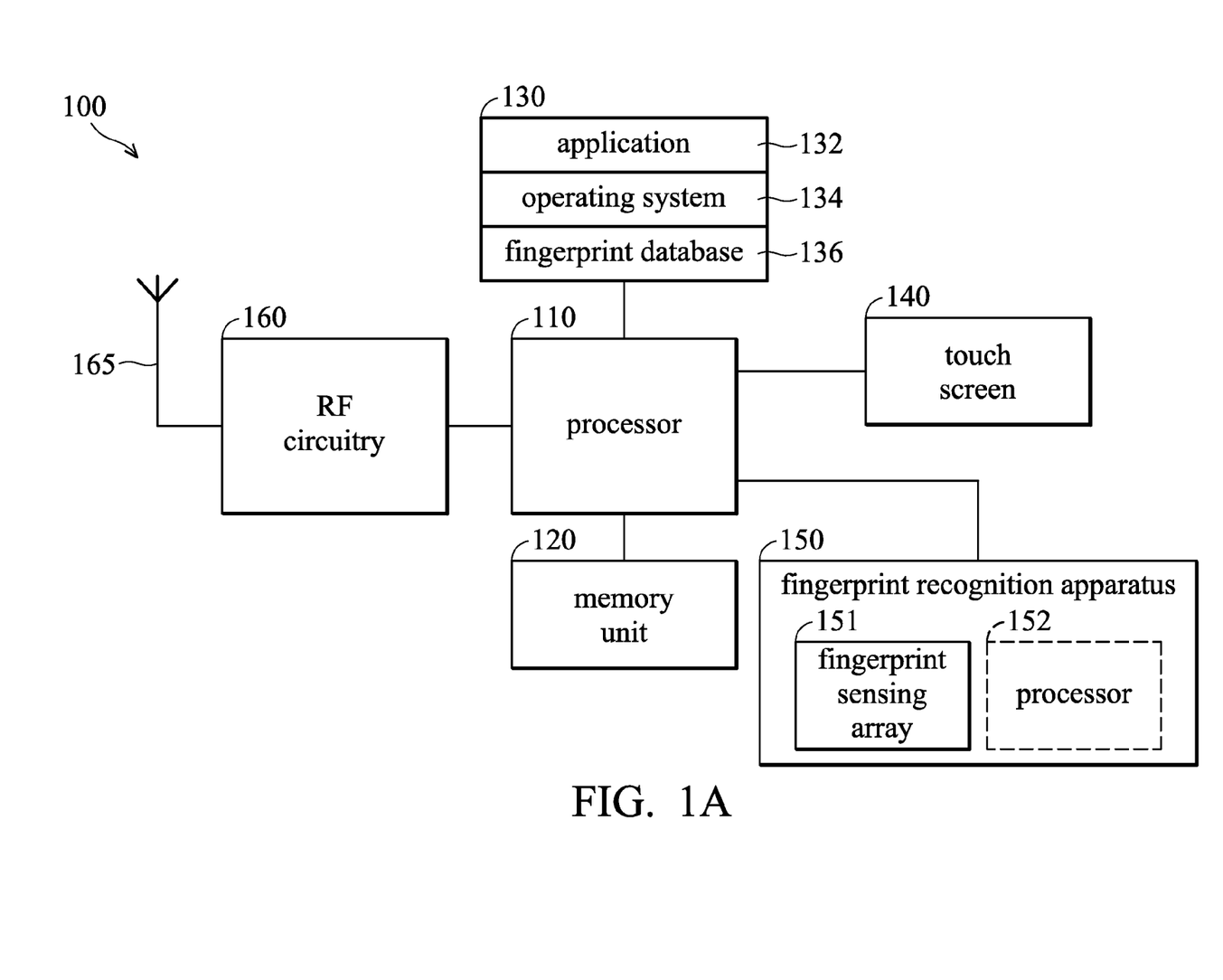
FIG. 1A is a block diagram of an electronic device in accordance with an embodiment of the invention.

FIG. 1A is a block diagram of an electronic device in accordance with an embodiment of the invention. As shown in FIG. 1A, the electronic device 100 comprises a processor 110, a memory unit 120, a storage unit 130, a touch screen 140, and a fingerprint recognition apparatus 150. In an embodiment, the electronic device 100 may be a smartphone, or a tablet PC. The processor 110 may be one or more central processing units (CPU), general-purpose processors, digital signal processors, or application-specific processors which execute one or more types of computer-readable mediums stored in the memory unit 120. The memory unit 120 and the storage unit 130 comprise one or more types of computer-readable mediums. For example, the memory unit 120 may be a high-speed random access memory such as SRAM or DRAM, and the storage unit 130 may be a non-volatile memory such as a flash memory (e.g. embedded multi-media card (eMMC)). The storage unit 130 stores the program code of an operating system 134 such as LINUX, UNIX, OS X, Android, iOS, Windows, or an embedded operating system. The operating system 134 may execute a plurality of sequences of basic system services and hardware dependent tasks.

In an embodiment, the storage unit 130 further comprises one or more applications 132. For example, the applications stored in the storage unit 130 may comprise a communication application, telephone application, email application, text message or instant message application, note application, address book or contact list, calendar, media player, and payment application. In an embodiment, the communication application controls the communication sequence and authentication sequence of the electronic device 100 while receiving an incoming call. For example, fingerprint recognition functionality is utilized to determine whether the user of the electronic device is currently receiving the incoming call, wherein the above-identified fingerprint recognition is performed by the fingerprint recognition apparatus 150 and the details will be described later. It should be noted that the above-mentioned communication application is for description, and those skilled in the art will appreciate that fingerprint recognition can be used in different types of applications to increase security. In addition, the storage unit 130 further comprises a fingerprint database 136, wherein the fingerprint database 136 pre-stores a plurality of biometric points of at least one user fingerprint image, and the stored biometric points are further utilized by the processor 110 to perform fingerprint recognition to identify a user.

The touch screen 140 may detect contact and any movement or break thereof using any of a plurality of touch sensitivity technologies now known or to be later developed, including, but not limited to capacitive, resistive, infrared, and surface acoustic wave technologies, as well as other proximity sensor arrays or other elements for determining one or more points of contact with the touch screen 140. However, the touch screen 140 may also display images from applications 132 executed by the processor 110.

In an embodiment, the fingerprint recognition apparatus 150 comprises a fingerprint sensor array 151 having a plurality of fingerprint sensing cells for detecting a fingerprint image of a user. For example, the fingerprint sensing cells may be optical sensors, ultrasonic sensors, capacitive sensors, or thermal sensors, but the invention is not limited thereto. In an embodiment, the fingerprint recognition apparatus 150 is further configured to detect whether a touch event takes place on the fingerprint recognition apparatus 150. In an embodiment, the processor 110 may analyze the fingerprint image detected by the fingerprint recognition apparatus 150, calculate biometric points of the fingerprint image, and match the calculated biometric points with the biometric points of the user's fingerprint image pre-stored in the fingerprint database 136 of the storage unit 130. When the calculated biometric points matches the pre-stored biometric points of the user's fingerprint image, the processor 110 generates an authentication signal which is further utilized by other applications requiring the authentication signal in the applications 132. In another embodiment, the fingerprint recognition apparatus 150 may optionally comprise a processor 152, wherein the processor 152 may be a digital signal processor or a microcontroller, and the above-mentioned operations performed by the processor 110 can be executed by the processor 152.

In an embodiment, the electronic device 100 further comprises radio frequency (RF) circuitry 160, which is coupled to one or more antennas 165 and may allow communication with one or more additional devices, computers and/or servers using a wireless network. The portable electronic device 100 may support various communications protocols, such as code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, Wi-MAX, a protocol for email, instant messaging (IM), and/or a short message service (SMS), but the invention is not limited thereto.

Figure 1B:
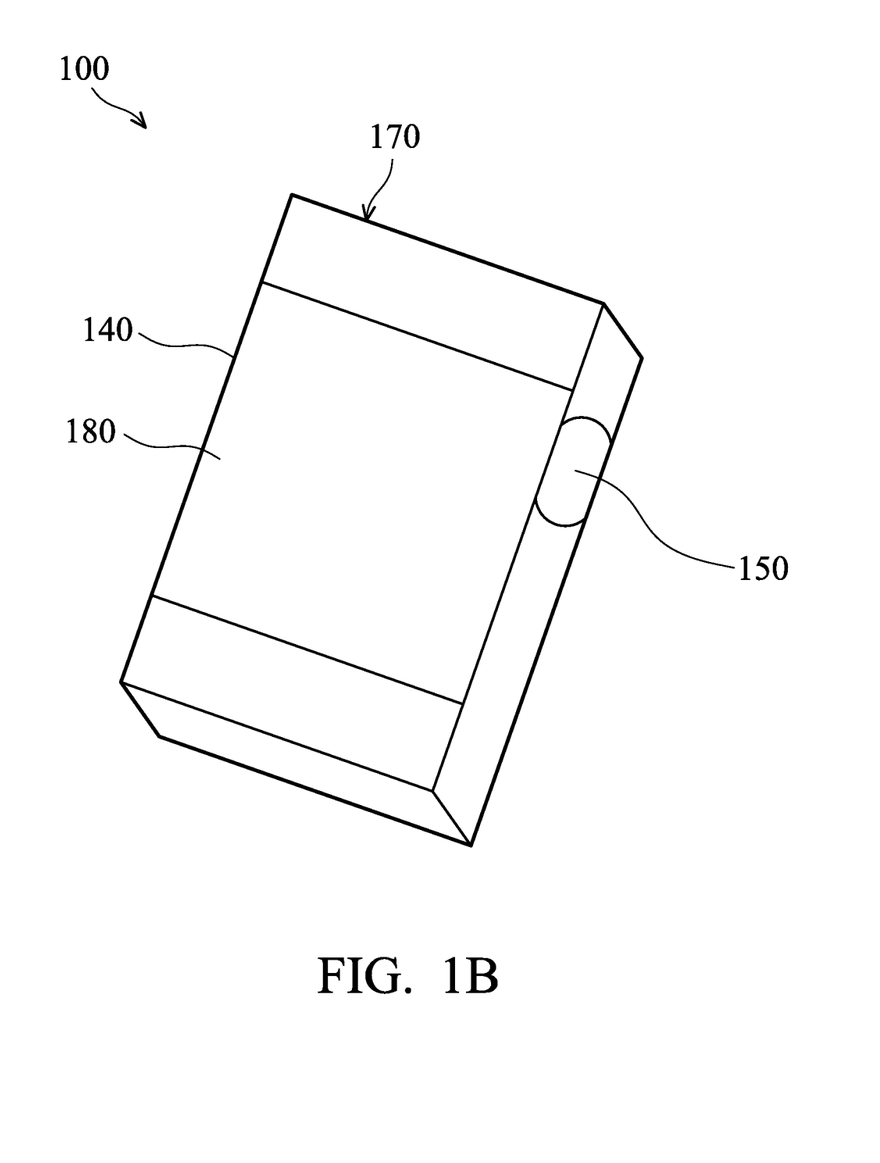
FIG. 1B is a top-view diagram of the electronic device 100 in accordance with an embodiment of the invention.

FIG. 1B is a top-view diagram of the electronic device 100 in accordance with an embodiment of the invention. As shown in FIG. 1B, the components of the electronic device 100 shown in FIG. 1A are deployed in a housing 170. The touch screen 140 is disposed on a first surface 180 of the housing, and the fingerprint recognition apparatus 150 is disposed on the side surface of the housing 170, such as any position of the side surface 182 between the first surface 180 and its opposite surface (i.e. the side surface is perpendicular to the first surface and its opposite surface).

Figure 2A:
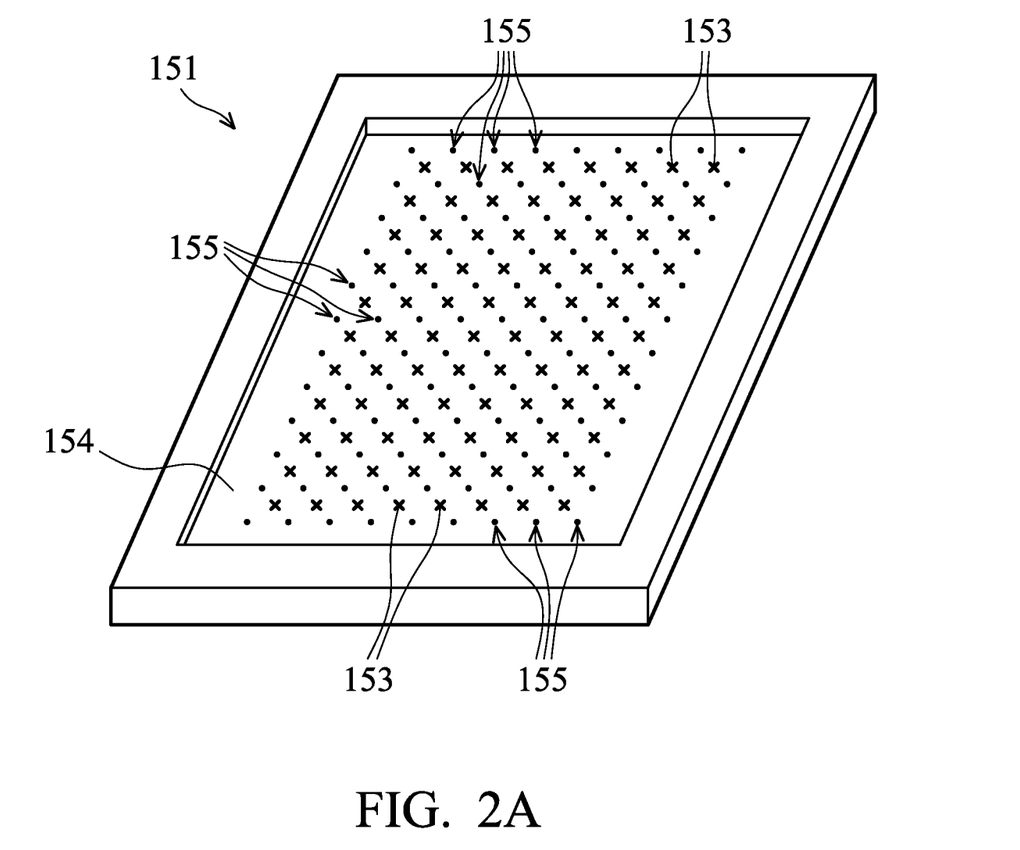
FIG. 2A is a diagram of the fingerprint sensor array 151 in accordance with an embodiment of the invention.

FIG. 2A is a diagram of the fingerprint sensor array 151 in accordance with an embodiment of the invention. As shown in FIG. 2A, the fingerprint sensor array 151 comprises a dielectric layer 154, a plurality of fingerprint sensing cells 155, and a plurality of touch detection cells 153. For example, each fingerprint sensing cell 155 can be implemented by a capacitive electrode which may sense an electric field to generate a second sensed image, and the electric field sensed by each fingerprint sensing cell 155 can be defined as an effective sensing region. Each touch sensing cell 153 can be also implemented by a capacitive electrode, and is configured to detect a touch event of an object (e.g. a finger) on the electronic device 100, such as detecting changes in the capacitance value of the capacitive electrode to generate a first sensed image. In an embodiment, the fingerprint sensing cells and the touch sensing cells 153 are arranged in an array, and each touch sensing cell 153 is interposed among four neighboring fingerprint sensing cells 155. In another embodiment, each touch sensing cell 153 is interposed between every two neighboring fingerprint sensing cells 155. In yet another embodiment, the array formed by the touch sensing cell 153 can be interposed within the array formed by the fingerprint sensing cells 155, and the number of the touch sensing cells 153 is less than that of the fingerprint sensing cells 155. That is, the resolution of the first sensed image generated by the touch sensing cells 153 is lower than that of the second sensed image generated by the fingerprint sensing cells 155.

In an embodiment, a higher resolution is required for the fingerprint sensing cells 155 to detect valleys and ridges of a fingerprint, and thus a greater operation voltage should be applied to the capacitive electrodes of the fingerprint sensing cells, resulting in higher power consumption. The touch sensing cells 153 are configured to detect touch events, and the resolution of the first sensed image generated by the touch sensing cells 153 is lower than that of the second sensed image generated by the fingerprint sensing cells while detecting fingerprint images. Accordingly, a lower operation voltage can be applied to the capacitive electrodes of the touch sensing cells 153. Specifically, when the electronic device 100 does not use the fingerprint recognition functionality, the processor 110 may control the fingerprint recognition apparatus 150 to enter a power-saving mode and only activate the touch sensing cells 153. When the processor 110 determines that a finger is pressed on the fingerprint recognition apparatus 150 by analyzing the first sensed image from the touch sensing cells 153, the processor 110 may control the fingerprint recognition apparatus 150 to enter an operating mode and activate the fingerprint sensing cells 155.

Figure 2B:
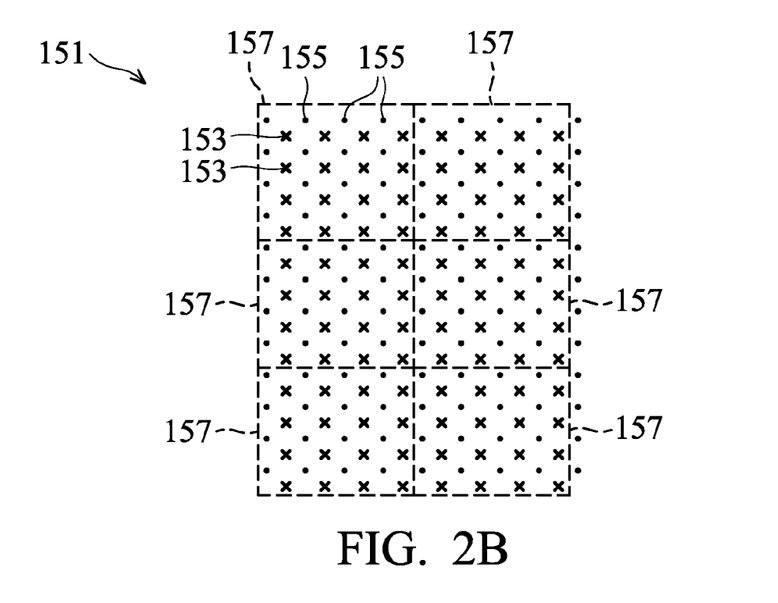
FIG. 2B is a diagram of the fingerprint sensor array 151 in accordance with an embodiment of the invention.

FIG. 2B is a diagram of the fingerprint sensor array 151 in accordance with an embodiment of the invention. For example, the resolution of the sensing image detected by the fingerprint sensor array 151 may be up to 128×128 pixels, and the fingerprint sensor array 151 can be divided into a plurality of sensing blocks 157, wherein the image resolution of each sensing block 157 may be up to 32×32 pixels. It should be noted that the numeric values of the image resolution of the fingerprint sensor array 151 and each sensing block 157 are for description only. Those skilled in the art will appreciate that the resolution of the fingerprint sensor array 151 and each sensing block can be adjusted based on practical conditions.

In an embodiment, the fingerprint recognition apparatus 150 may stay in a power-saving mode when the fingerprint recognition apparatus 150 is not being utilized by the applications. In the power-saving mode, the fingerprint recognition apparatus 150 may decrease the image resolution of the detected image in order to save power. For example, in an embodiment, the fingerprint recognition apparatus 150 may activate all or only a portion of the touch sensing cells 153 of the fingerprint sensor array 151. For example, the fingerprint recognition apparatus 150 may activate only one of the sensing blocks 157 to detect the first sensed image having a resolution of 32×32 pixels. The processor 110 may determine that the object touching on the fingerprint recognition apparatus 150 is a human finger or other object according to the first sensed image. When it is determined that a human's finger is touching on the fingerprint recognition apparatus 150, the processor 110 will activate all or a portion of the fingerprint sensing cells 155 to capture the second sensed image, wherein the resolution of the second sensed image is higher than that of the first sensed image.

Figure 2C:
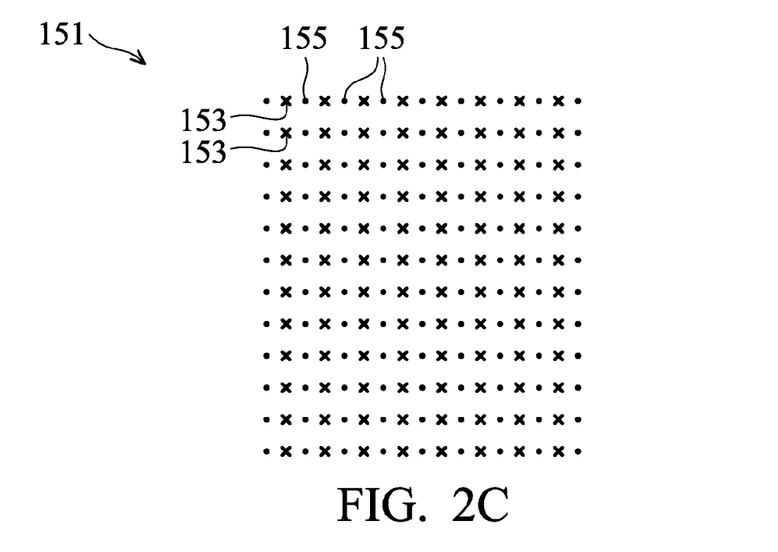
FIG. 2C is a diagram of the fingerprint sensor array 151 in accordance with another embodiment of the invention.

FIG. 2C is a diagram of the fingerprint sensor array 151 in accordance with another embodiment of the invention. As shown in FIG. 2C, in another embodiment, the touch sensing cells 153 can be disposed between two neighboring fingerprint sensing cells 155 of the fingerprint sensor array 151. For example, a touch sensing cell 153 can be disposed between every two horizontally neighboring fingerprint sensing cells 155. For those skilled in the art, it will be appreciated that FIG. 2B and FIG. 2C are only for description purpose, and the invention is not limited to the aforementioned arrangement. In addition, the array of the fingerprint sensing cells 155 and the array of the touch sensing cells 153 can be arranged in different ways and may have different number of sensing cells. When the fingerprint recognition apparatus 150 is in the power-saving mode, all or a portion of the touch sensing cells 153 are activated to capture the first sensed image. The processor 110 determines whether a human finger or another object is touching on the fingerprint recognition apparatus 150 according to the first sensed image. When it is determined that a human's finger is touching on the fingerprint recognition apparatus 150 (i.e. the first sensed image is a fingerprint image), the processor 110 will activate all or a portion of the fingerprint sensing cells to capture the second sensed image, wherein the resolution of the second sensed image is higher than that of the first sensed image.

In yet another embodiment, when the fingerprint recognition apparatus 150 is not being used by the applications (e.g. the processor 110 has not received a fingerprint recognition request signal), the fingerprint recognition apparatus stays in a power-down mode. When the processor 110 receives a fingerprint recognition request signal (e.g. the communication application receives an incoming call and generates the fingerprint recognition request signal), the processor 110 determines that the incoming call can be accepted or picked up only when the fingerprint authentication is approved. Meanwhile, the processor 110 controls the fingerprint recognition apparatus to enter a power-saving mode, such as using the methods described in the embodiments in FIG. 2B or FIG. 2C to activate all or a portion of the touch sensing cell 153 to capture the first sensed image. When the processor determines that the first sensed image is a fingerprint image, the processor 110 activates all or a portion of the fingerprint sensing cells 155, so that the fingerprint recognition apparatus 150 enters an operation mode to capture the second sensed image with a higher resolution in order to perform fingerprint recognition. The processor 110 further calculates the biometric points of the second sensed image, and matches the calculated biometric points with the biometric points of the user's fingerprint image pre-stored in the fingerprint database 136. When the biometric points match, the processor 110 will transmit a fingerprint authentication approval signal to the corresponding application.

Figure 2D:
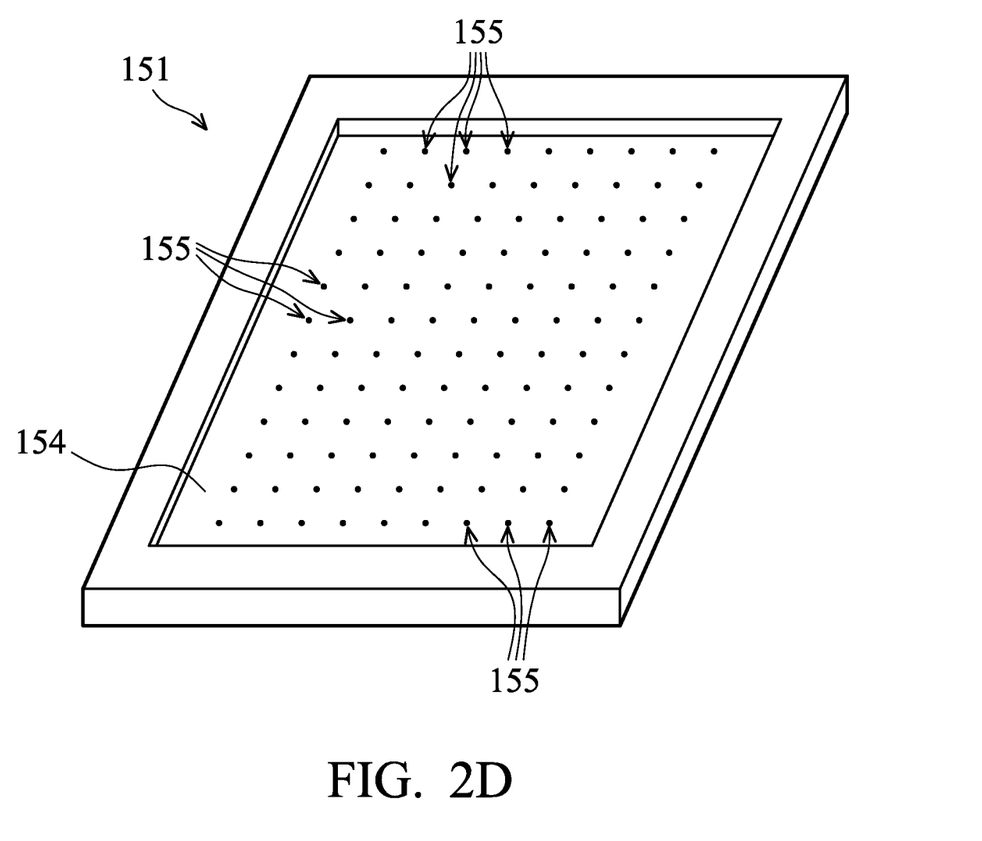
FIG. 2D is a diagram of the fingerprint sensor array 151 in accordance with another embodiment of the invention.

FIG. 2D is a diagram of the fingerprint sensor array 151 in accordance with another embodiment of the invention. In another embodiment, the fingerprint sensor array 151 comprises a dielectric layer 154, and a plurality of fingerprint sensing cells 155. It should be noted that the fingerprint recognition apparatus 150 does not comprise the touch sensing cells 153 as shown in FIG. 2A. That is, the fingerprint recognition apparatus 150 only comprises the fingerprint sensing cells 155. In the power-saving mode, the fingerprint recognition apparatus 150 only activates a portion of the fingerprint sensing cells 155 in the fingerprint sensor array 151 to capture a first sensed image. The processor 110 determines whether the object touching on the fingerprint recognition apparatus 150 is a human's finger or other object. When it is determined that a human's finger is touching on the fingerprint recognition apparatus 150, the processor 110 will activate all or a portion of the fingerprint sensing cells 155 to capture a second sensed image, wherein the resolution of the second sensed image is higher than that of the first sensed image. For example, the first way for activating a portion of the fingerprint sensing cells 155 indicates that the activated fingerprint sensing cells 155 are interleaved, and there are one or more inactivated fingerprint sensing cells 155 between two neighboring activated fingerprint sensing cells 155. For example, when the fingerprint recognition apparatus is in the power-saving mode, the processor 110 may activate one of every four fingerprint sensing cells 155 to capture a first sensed image. When the processor 110 determines that a human's finger is touching on the fingerprint recognition apparatus 150 (e.g. determining that the first sensed image is a fingerprint image), the processor 110 may activate one of every two fingerprint sensing cells 155, or activate all of the fingerprint sensing cells 155, to capture a second sensed image having a higher resolution.

Figure 2E:
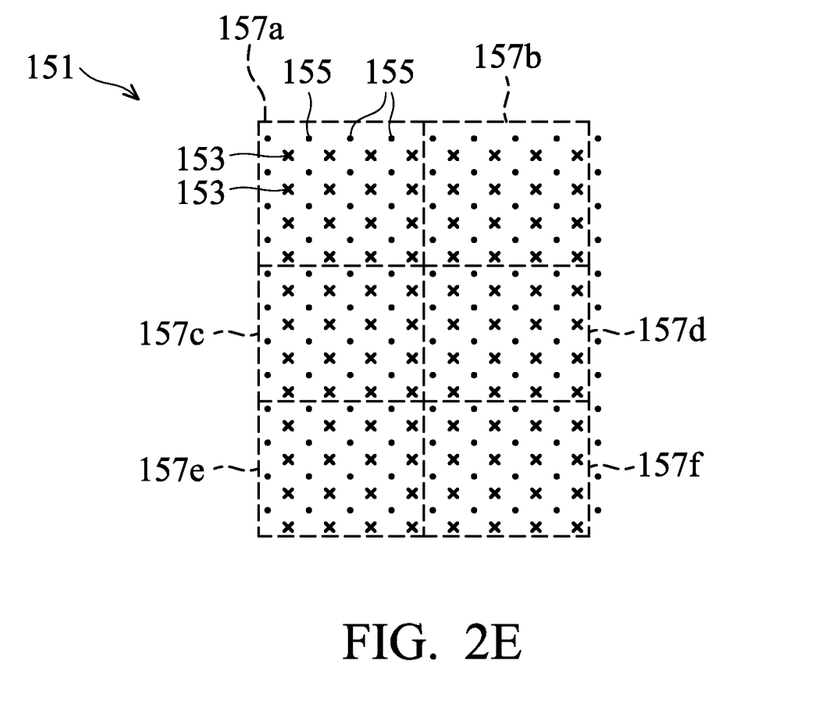
FIG. 2E is a diagram of the fingerprint sensor array 151 in accordance with another embodiment of the invention.

FIG. 2E is a diagram of the fingerprint sensor array 151 in accordance with another embodiment of the invention. In the above-mentioned embodiment, alternatively, the second way is to divide the fingerprint sensing cells 155 of the fingerprint sensor array 151 into a plurality of sensing blocks such as the sensing blocks 157a-157f as shown in FIG. 3E. Additionally, a portion of sensing blocks 157 (e.g. one or more sensing blocks 157) are activated in the power-saving mode to capture a first sensed image. When the processor 110 determines that a human's finger is touching on the fingerprint recognition apparatus 150 according to the first sensed image, the processor 110 activates all or a portion of the sensing blocks 157 to capture a second sensed image, wherein the resolution of the second sensed image is higher than that of the first sensed image. For example, when the fingerprint recognition apparatus 150 is in the power-saving mode, the processor 110 may activate the sensing blocks 157a, 157d, and 157e to capture a first sensed image. When the processor 110 determines that a human's finger is touching on the fingerprint recognition apparatus 150 (e.g. determining that the first sensed image is a fingerprint image), the processor 110 may activate all of the sensing blocks 157a-157f to capture a second sensed image having a higher resolution.

Figure 3:
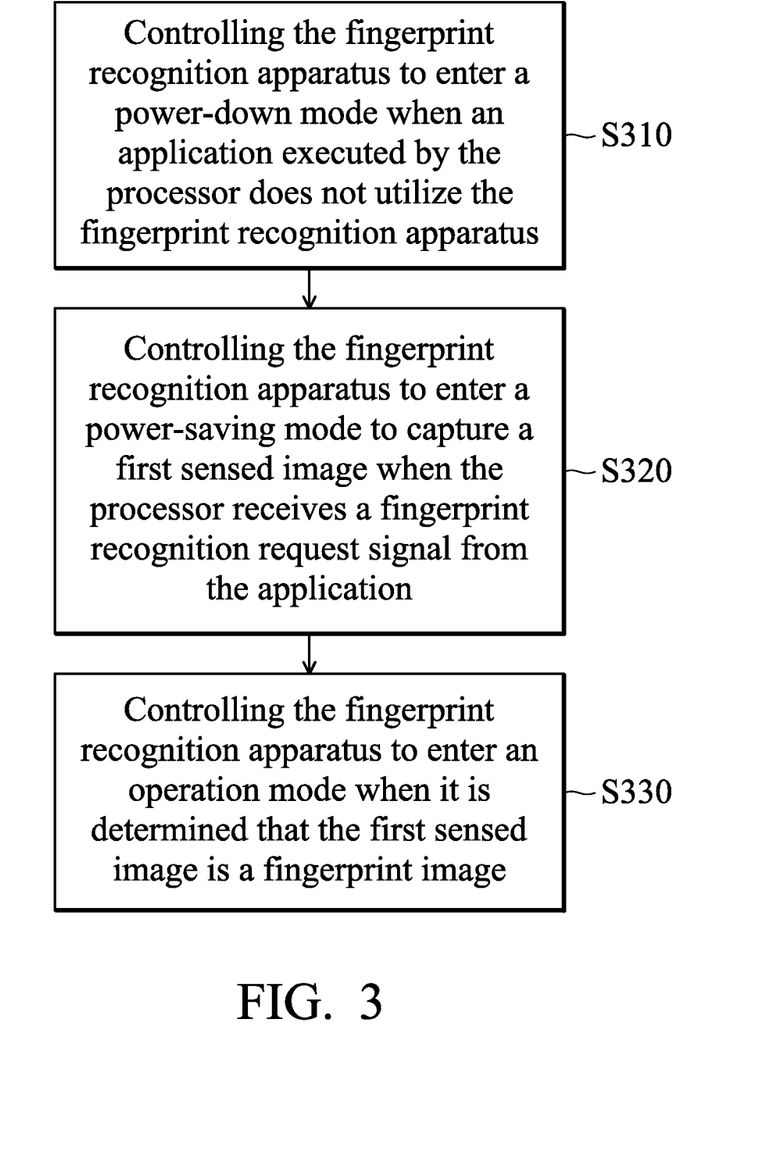
FIG. 3 is a flow chart of the control method of a fingerprint recognition apparatus in accordance with an embodiment of the invention.

FIG. 3 is a flow chart of the control method of a fingerprint recognition apparatus in accordance with an embodiment of the invention. In step S310, when the application executed by the electronic device 100 does not utilize fingerprint recognition functionality, the fingerprint recognition apparatus 150 (e.g. disposed on the side surface of the electronic device 100) enters a power-down mode. For example, in the power-down mode, the touch sensing cells 153 and the fingerprint sensing cells 155 of the fingerprint recognition apparatus 150 are not activated. In step S320, when the processor 110 receives a fingerprint recognition request signal from the application, the processor 110 controls the fingerprint recognition apparatus 150 to enter a power-saving mode and activates the touch sensing cells 153 to capture a first sensed image. It should be noted that, in the power-saving mode, all or only a portion of the touch sensing cells 153 in the fingerprint sensor array 151 are activated to capture a first sensed image having a lower resolution. In step S330, when the processor 110 (or processor 152) determines that the captured first sensed image is a fingerprint image, the processor 110 controls the fingerprint recognition apparatus 150 to enter an operation mode. In the operation mode, the processor 110 activates all or a portion of the fingerprint sensing cells 155 in the fingerprint recognition apparatus 150 to capture a second sensed image, wherein the resolution of the second sensed image is higher than that of the first sensed image.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a processor;
a fingerprint recognition apparatus comprising a plurality of fingerprint sensing cells and a plurality of touch sensing cells; and
a housing, wherein the processor is installed inside the housing,
wherein when an application executed by the processor does not utilize the fingerprint recognition apparatus, the processor controls the fingerprint recognition apparatus to enter a power-down mode to turn off the fingerprint sensing cells and the touch sensing cells,
wherein when the processor receives a fingerprint recognition request signal from the application, the processor further controls the fingerprint recognition apparatus to enter a power-saving mode to capture a first sensed image,
wherein when the processor determines that the first sensed image is a fingerprint image, the processor further controls the fingerprint recognition apparatus to enter an operation mode to capture a second sensed image for fingerprint authentication,
wherein the processor activates a portion or all of the fingerprint sensing cells in the fingerprint recognition apparatus to capture the second sensed image in the operation mode, and wherein the resolution of the second sensed image is higher than that of the first sensed image.

2. The electronic device as claimed in claim 1, wherein when the fingerprint recognition apparatus enters the power-saving mode, the processor activates all or only a portion of the touch sensing cells to capture the first sensed image.

3. The electronic device as claimed in claim 1, wherein the plurality of fingerprint sensing cells are arranged in a first array, and the touch sensing cells are arranged in a second array, wherein the second array is interposed within the first array.

4. The electronic device as claimed in claim 1, wherein the application is a communication application, and the communication application generates the fingerprint recognition request signal when the communication application is receiving an incoming call.

5. The electronic device as claimed in claim 1, further comprising: a touch screen, disposed on a first surface of the housing, wherein the fingerprint recognition apparatus is disposed on a second surface of the housing, and the second surface is perpendicular to the first surface.

6. A control method of a fingerprint recognition apparatus, for use in an electronic device, wherein the electronic device comprises a processor, a fingerprint recognition apparatus, and a housing, wherein the fingerprint recognition apparatus comprises a plurality of fingerprint sensing cells and a plurality of touch sensing cells, and the processor is installed within the housing, the method comprising:
controlling the fingerprint recognition apparatus to enter a power-down mode to turn off the fingerprint sensing cells and the touch sensing cells when an application executed by the application does not utilize the fingerprint recognition apparatus;

controlling the fingerprint recognition apparatus to enter a power-saving mode to capture a first sensed image when the processor receives a fingerprint recognition request signal from the application; and controlling the fingerprint recognition apparatus to enter an operation mode to capture a second sensed image for fingerprint authentication when it is determined that the first sensed image is a fingerprint image;

the method further comprising:

activating a portion or all of the fingerprint sensing cells to capture the second sensed image in the operation mode, wherein the resolution of the second sensed image is higher than that of the first sensed image.

7. The method as claimed in claim 6, further comprising:
activating all or only a portion of the touch sensing cells to capture the first sensed image when the fingerprint recognition apparatus enters the power-saving mode.

8. The method as claimed in claim 6, wherein the plurality of fingerprint sensing cells are arranged in a first array, and the touch sensing cells are arranged in a second array, wherein the second array is interposed within the first array.

9. The method as claimed in claim 6, wherein the application is a communication application, and the communication application generates the fingerprint recognition request signal when the communication application is receiving an incoming call.

10. The method as claimed in claim 6, wherein the electronic device further comprises a touch screen, disposed on a first surface of the housing, wherein the fingerprint recognition apparatus is disposed on a second surface of the housing, and the second surface is perpendicular to the first surface.

11. An electronic device, comprising:
a processor;
a fingerprint recognition apparatus comprising a plurality of fingerprint sensing cells; and
a housing, wherein the processor is installed inside the housing,
wherein when an application executed by the processor does not use the fingerprint recognition apparatus, the processor controls the fingerprint recognition apparatus to enter a power-down mode to turn off the fingerprint sensing cells,
wherein when the processor receives a fingerprint recognition request signal from the application, the processor further controls the fingerprint recognition apparatus to enter a power-saving mode, and activates a portion of the fingerprint sensing cells to capture a first sensed image,
wherein when the processor determines that the first sensed image is a fingerprint image, the processor further controls the fingerprint recognition apparatus to enter an operation mode to capture a second sensed image for fingerprint authentication,
wherein the processor further controls the fingerprint recognition apparatus to activate an interleaved portion of the fingerprint sensing cells to capture the first sensed image in the power-saving mode, and
wherein the processor further controls the fingerprint recognition apparatus to activate an interleaved portion of or all of the fingerprint sensing cells to capture the second sensed image in the operation mode, wherein the resolution of the second sensed image is higher than that of the first sensed image.

12. The electronic device as claimed in claim 11, wherein the fingerprint sensing cells are divided into a plurality of sensing blocks, and the processor further controls the fingerprint recognition apparatus to activate a portion of the sensing blocks to capture the first sensed image in the power-saving mode.

13. The electronic device as claimed in claim 12, wherein the processor further controls the fingerprint recognition apparatus to activate all or a portion of the sensing blocks to capture the second sensed image in the operation mode, wherein the resolution of the second sensed image is higher than that of the first sensed image.

14. A control method of a fingerprint recognition apparatus, for use in an electronic device, wherein the electronic device comprises a processor, a fingerprint recognition apparatus, and a housing, wherein the fingerprint recognition apparatus comprises a plurality of fingerprint sensing cells, and the processor is installed within the housing, the method comprising:

controlling the fingerprint recognition apparatus to enter a power-down mode to turn off the fingerprint sensing cells and the touch sensing cells when an application executed by the application does not utilize the fingerprint recognition apparatus;

controlling the fingerprint recognition apparatus to enter a power-saving mode and activate a portion of the fingerprint sensing cells to capture a first sensed image when the processor receives a fingerprint recognition request signal from the application; and controlling the fingerprint recognition apparatus to enter an operation mode to capture a second sensed image for fingerprint authentication when it is determined that the first sensed image is a fingerprint image;

the method further comprising:

controlling the fingerprint recognition apparatus to activate an interleaved portion of the fingerprint sensing cells to capture the first sensed image in the power-saving mode; and controlling the fingerprint recognition apparatus to activate an interleaved portion of or all of the fingerprint sensing cells to capture the second sensed image in the operation mode, wherein the resolution of the second sensed image is higher than that of the first sensed image.

15. The method as claimed in claim 14, wherein the fingerprint sensing cells are divided into a plurality of sensing blocks, and the method further comprises:
controlling the fingerprint recognition apparatus to activate a portion of the sensing blocks to capture the first sensed image in the power-saving mode.

16. The method as claimed in claim 15, further comprising:
controlling the fingerprint recognition apparatus to activate all or a portion of the sensing blocks to capture the second sensed image in the operation mode, wherein the resolution of the second sensed image is higher than that of the first sensed image.

* * * * *